United States Patent [19]
Tashiro

[11] Patent Number: 5,518,391
[45] Date of Patent: May 21, 1996

[54] APPARATUS AND POLYHEDRAL MEMBER FOR CUTTING AND SHAPING A BAR-SHAPED DOUGH BODY

[75] Inventor: Yasunori Tashiro, Tochigi, Japan

[73] Assignee: Rheon Automatic Machinery Co., Ltd., Utsunomiya, Japan

[21] Appl. No.: 255,017

[22] Filed: Jun. 7, 1994

[30] Foreign Application Priority Data

Jun. 11, 1993 [JP] Japan .................................. 5-166105
Jun. 18, 1993 [JP] Japan .................................. 5-172737

[51] Int. Cl.⁶ .............................. A21C 11/10; A21D 6/00; B26D 1/12
[52] U.S. Cl. .......................... 425/308; 425/316; 425/132; 426/503; 426/518; 83/672; 83/932
[58] Field of Search .................................. 425/308, 316, 425/287, 132, 142, 406, 466; 83/51, 591, 672, 932; 366/85, 301; 426/516, 518, 503

[56] References Cited

U.S. PATENT DOCUMENTS

| | | | |
|---|---|---|---|
| 4,343,929 | 8/1982 | Sugio et al. | 528/241 |
| 4,734,024 | 3/1988 | Tashiro | 425/132 |
| 4,767,305 | 8/1988 | Tashiro | 425/308 |
| 4,966,542 | 10/1990 | Kobayashi | 425/307 |
| 5,048,971 | 9/1991 | Wall et al. | 366/85 |
| 5,186,539 | 2/1993 | Manser et al. | 366/85 |
| 5,223,277 | 6/1993 | Watanabe et al. | 425/132 |
| 5,286,185 | 2/1994 | Tashiro et al. | 425/140 |
| 5,385,073 | 1/1995 | Truemner et al. | 83/322 |

Primary Examiner—Robert J. Warden
Assistant Examiner—Christopher Y. Kim
Attorney, Agent, or Firm—Guy W. Shoup; Patrick T. Bever

[57] ABSTRACT

An assembly for cutting and shaping a bar-shaped dough body including a plurality of polyhedral cutting members disposed around an opening through which the bar-shaped dough body is extruded. The polyhedral members are rotatably mounted around the opening and are formed to cooperatively close the opening, thereby cutting the bar-shaped dough body, multiple times during each revolution of the polyhedral members. Each polyhedral member includes curved sides meeting at one or more tip edges, the tip edges of each of the polyhedral members meeting at a center of the opening when the bar-shaped dough body is cut.

17 Claims, 10 Drawing Sheets

5,518,391

APPARATUS AND POLYHEDRAL MEMBER FOR CUTTING AND SHAPING A BAR-SHAPED DOUGH BODY

TECHNICAL FIELD

This invention relates to an apparatus for cutting and shaping a food product consisting of a filling enveloped with a cover such as a bean-Jam bun. More especially, it relates to an apparatus comprising polyhedral members, each of which is pivotally fitted to each of rotary shafts that are disposed on an imaginary circle so that the members form and close an opening surrounded by them, thereby to cut and shape the dough body passing through the opening.

1. Prior Art

U.S. Pat. Nos. 4,734,024, 4,883,678, and 5,190,770, also filed by the applicant of this application, disclose apparatuses for cutting and shaping an enveloped body such as a bean-jam bun from a continuous bar of dough consisting of a filling and a dough coating.

2. Problems to be Resolved

While these apparatuses are practical and capable of cutting and shaping an intended product, they have some drawbacks. When they continuously process dough for a long time, due to their mechanism, in which the members slide on each other or swing around their axes to close and open the central opening, they may overheat and seize up, and thus the operation will be interrupted.

Further, bits of dough materials or adhesion-preventing powders tend to remain or gather at the tip portions of the members during the cutting process. These unwanted residual materials or powders may cause problems of adhering to the members and the cut dough body, as well as of protrusions of the filling from the cover.

In addition, there are difficulties in producing a product with a smooth cover free from flower-like patterns or folds, which appear at its top, resulting from small gaps formed between the cutting members when the tips thereof gather at the center of the apparatus.

Accordingly, one object of this invention is to provide a simple and durable device for cutting and shaping a bar-shaped dough body that can continuously operate for a long time without the members seizing up.

Another object of this invention is to provide an improved member for cutting and shaping a bar-shaped dough body that eliminates dough adhesion and filling protrusions that are due to materials remaining after, or gathering during, the operation, at the part of the member near the opening.

A further object of this invention is to provide an improved apparatus that can precisely and neatly produce a spherical dough product without generating any irregularities formed on the cover of the product.

SUMMARY OF THE INVENTION

In one embodiment the polyhedral member of this invention comprises upper and lower plane surfaces running parallel to each other and providing the member with a predetermined thickness, two longitudinal side surfaces, each of which is formed along an arc whose radius is equal to the distance between two adjacent shafts that are equidistantly disposed on an imaginary circle, and two tips at which the two longitudinal side surfaces abut each other, which form cutting edges. When the tips of the polyhedral members in use are positioned at the center of the circle, each of the centers of the arcs that corresponds to the two side surfaces of the polyhedral members is at the same time located at a distance from the shaft of a member that is equal to the radius of the circle and at a distance from the center of the circle that is equal to the distance between two adjacent shafts. The members form between themselves an opening that can be closed or reopened by the rotational movement of the members.

In another embodiment, each of the side surfaces is configured such that the surface on the side of one tip is convex about an axis orthogonal to the shaft, and the surface on the side of the other tip is concave. The degrees of the curvature of the convex and concave surfaces of the member are increasingly sharper toward the tips.

In another embodiment, the apparatus of this invention for cutting and shaping a bar-shaped dough body comprises at least the three identically-shaped polyhedral members, wherein the polyhedral members are associated such that they radially and collectively form or close an opening concentric to the circle, a tip portion of one polyhedral member tracks the side surface of an adjacent polyhedral member, and wherein the opening is confined by the side surfaces of the polyhedral members by the rotary movement thereof so that the bar-shaped dough body passing through the opening is cut and shaped.

In a further embodiment, when the tips are positioned at the center of the circle each of the centers of the arcs that correspond to the side surfaces of the polyhedral members of this invention is at the same time located at a distance from the shaft of a member that is equal to the radius of the circle and at a distance from the center of the circle that is equal to the distance between two adjacent shafts.

In another embodiment, one tip portion of each member is cut away.

In another embodiment, the apparatus of this invention for cutting a bar-shaped dough body comprises three identically-shaped polyhedral members. Each member is rotatably fitted to each of three shafts that are equidistantly disposed on an imaginary circle such that the members radially and collectively form or close an opening concentric to the circle. Each member has three sides. They form a tip between every two adjacent sides. Each side is formed along an arc whose radius is equal to the distance between two adjacent shafts. When one of the tips is positioned at the center of the circle, each center of the arcs that correspond to the two sides that abut each other at the circle's center is at the same time located at a distance from the shaft of a member that is equal to the radius of the circle and at a distance from the center of the circle that is equal to the distance between two adjacent shafts. The center of the arc corresponding to the remaining side is located at the center of the circle. In this embodiment the members are associated such that the opening is closed by the rotation of the members so that the bar-shaped dough body passing through the opening is cut and shaped.

DETAILED DESCRIPTION OF THE INVENTION

Figure 1A:
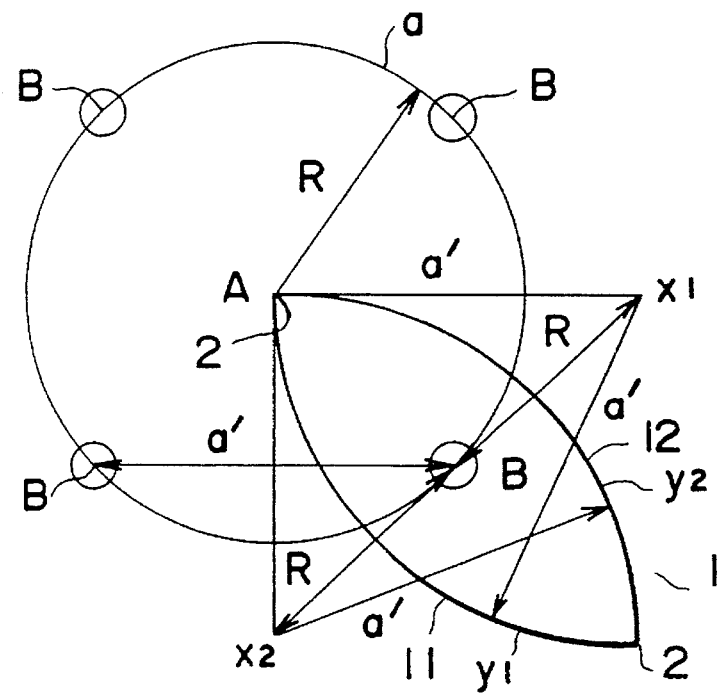
FIG. 1A is a plan that shows the shape of a first embodiment of a polyhedral member of this invention.
Figure 1B:
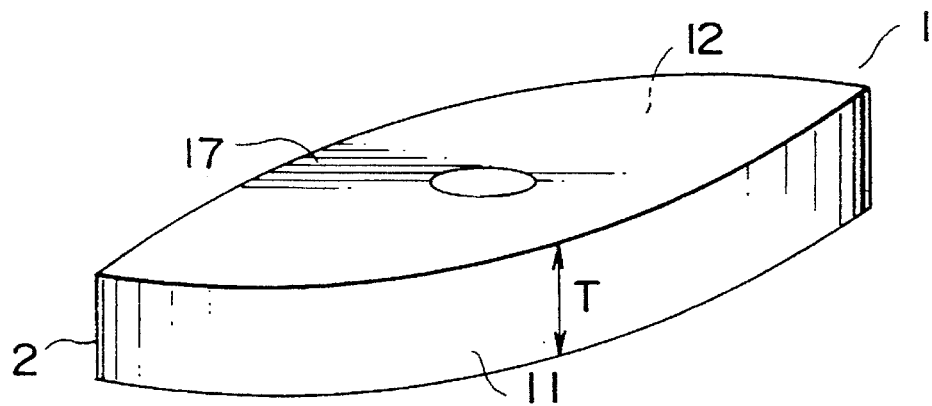
FIG. 1B is a perspective view of a polyhedral member of the first embodiment of this invention.
Figure 1C:
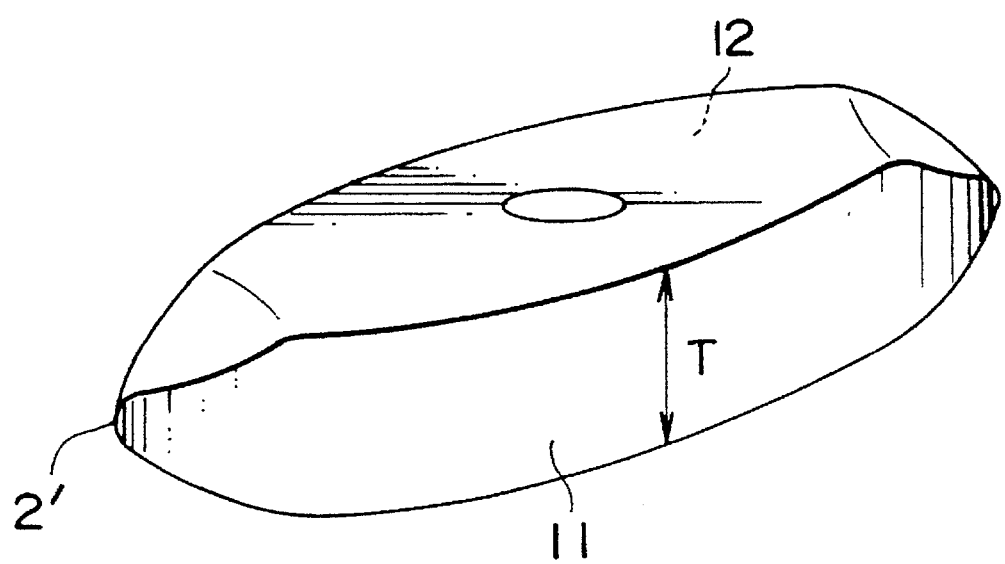
FIG. 1C is a perspective view of a modified polyhedral member of the first embodiment of this invention.

This invention will now be explained based on a first embodiment. FIGS. 1A, 1B, and 1C show the characteristic shapes of a polyhedral member of the first embodiment.

In FIG. 1A four axes B, for supporting shafts 6 (FIGS. 5A and 5B), are equidistantly disposed on an imaginary circle a drawn with a radius R around the center A. A polyhedral member 1 is fitted to a shaft positioned at one of the axes.

The distance between the two adjacent axes B is represented by a'. A first side surface 11 and a second side surface 12 of the polyhedral member 1 are formed along arcs y1 and y2, respectively. The radius of each of the arcs y1 and y2 is equal to the distance a'. The center x1 of the arc y1 and the center x2 of the arc y2 are located at the same time at a distance from the axis B that is equal to the radius R and at a distance from the center A that is equal to the distance a', respectively.

The upper and lower surfaces 17 of the polyhedral member 1 are flat and parallel to each other. They provide the polyhedral member 1 with a predetermined thickness T. They abut each other at tips 2.

The side surfaces 11 and 12 and the tips 2 constitute the blade part of the member that contacts, shapes, and cuts a material. When as shown in FIG. 2 the member in use is rotated counterclockwise, the left side of the side surface 11 or 12, viewed from the front of either one, serves as the blade.

Figure 2:
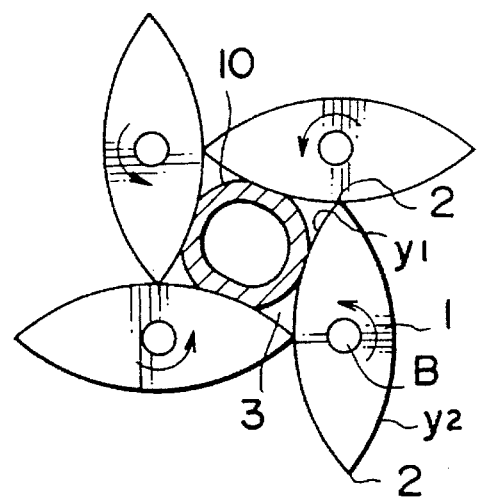
FIGS. 2–4 are schematic views of an assembly of the polyhedral members of this invention. They show the functions of the cutting and shaping process of an assembly using the first embodiment.
Figure 3:
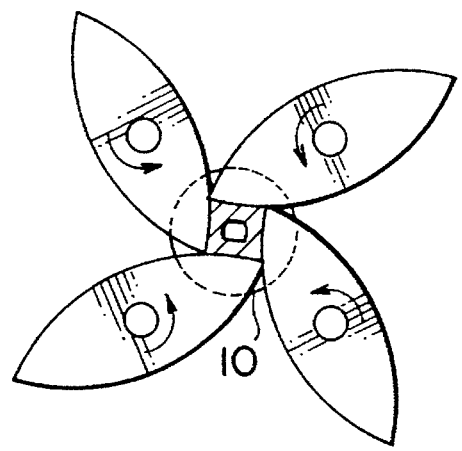
Figure 4:
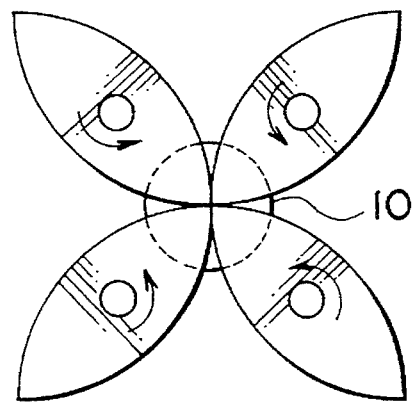

As shown in FIGS. 2–4, four of these polyhedral members 1 are associated such that each of them is rotatably fitted to one of the shafts so that a central opening 3 is formed and closed when they continuously rotate in one direction, and so that all of their tips abut each other at the center A to divide the bar-shaped dough when the opening is closed. The direction of rotation, clockwise or counterclockwise, may optionally be selected.

The locus of the tips 2 is defined such that when the polyhedral member 1 rotates, either of the two tips of each member tracks the first or second side 11, 12 of an adjacent member with no interference therebetween.

Figure 5A:
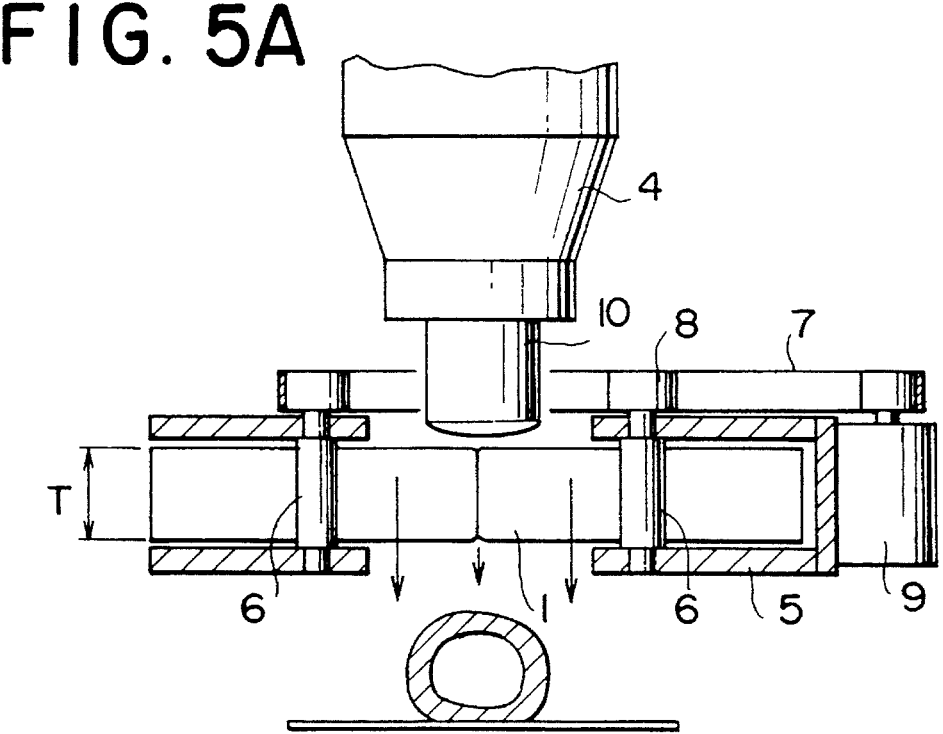
FIGS. 5A and 5B show partially-sectional views of apparatuses using the first and second embodiments of the polyhedral members of this invention, respectively.

Referring to FIG. 5A, an example of the specific cutting and shaping apparatus used for this invention will now be explained. A cutting and shaping apparatus, comprising the characteristic polyhedral members 1 of this invention, is positioned under means 4 to supply a double-layered bar-shaped dough 10. The means 4 can be any known device.

Four rotary shafts 6, equidistantly positioned on an imaginary circle, are provided in a housing 5. The polyhedral members 1 are fitted to their respective shafts 6 so that they are on a coplanar plane. One end of each shaft 6 is connected to a timing pully 8 which engages a timing belt 7 so that the polyhedral members 1 are synchronously driven by a motor 9 mounted on the housing 5.

The housing 5 is arranged to go up and down through driving means (not shown) in synchronism with the rotation of the polyhedral members 1. The up and down movement of the housing is synchronized with the movement of the opening 3 such that as the opening closes as shown in FIGS. 2–4 the housing gradually descends. It goes up to return to its original position when the opening is fully opened and when there is no interference from the dough.

The functions and effects of the first embodiment of this invention will now be explained by referring to FIGS. 2–4. FIG. 2 shows a cross section of a bar-shaped dough body 10 consisting of a filling enveloped in a dough coating. As the opening 3 closes, either side surface 11 or 12 of the polyhedral member presses and moves the coating toward the center.

At this time a neck, having a reduced surface area, is formed on the coating between the upper and lower parts of the polyhedral members so that the bar-shaped dough can be cut without making the outer cover thinner, and without the filling protruding.

The amount of the dough that is moved at this time by the side surface 11 or 12 toward the center can be adjusted by changing the thickness T of the part of the polyhedral member 1 that presses the dough.

Thus, as shown in FIG. 1C, by providing polyhedral members that have parts wherein the thicknesses decrease toward their tips 2', in addition to providing a polyhedral member with a constant thickness T (FIG. 1B), the cutting and shaping process of this invention can be adjusted per the properties of the dough materials such as bread and cake dough.

Figure 6A:
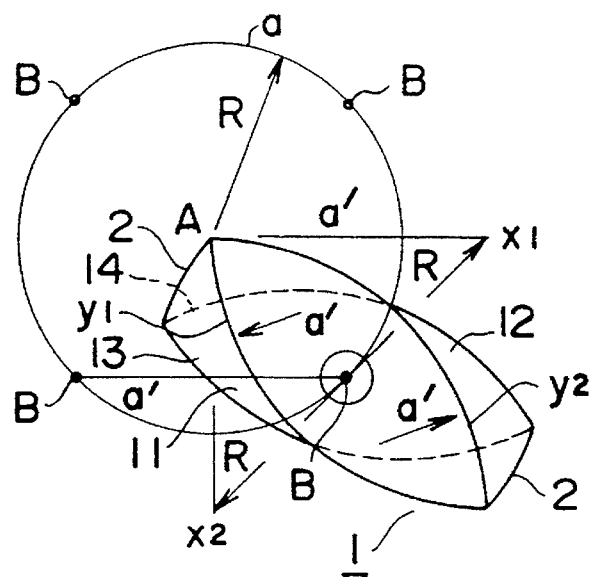
FIG. 6A is a plan showing the shapes of the second embodiment of a polyhedral member of this invention.
Figure 6B:
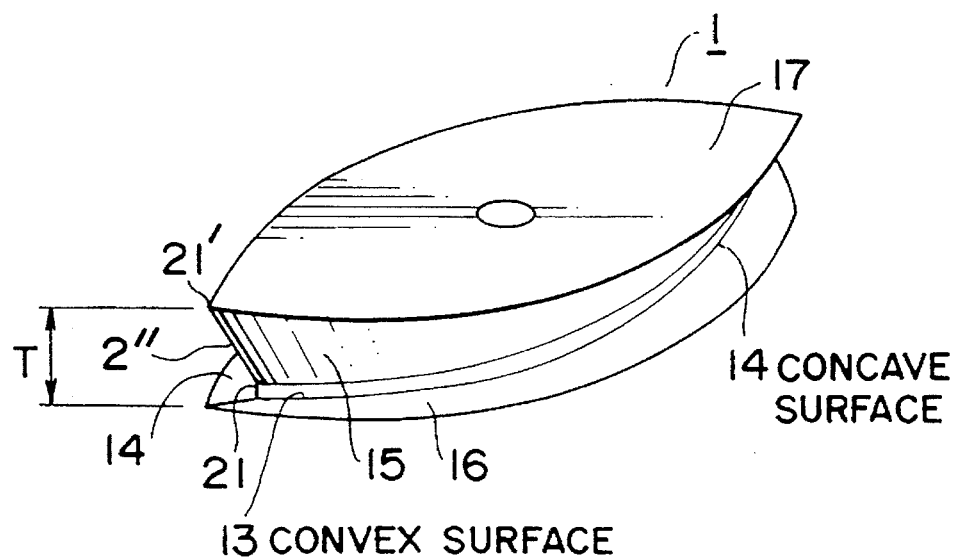
FIG. 6B is a perspective view of a polyhedral member of the second embodiment of this invention.

Based on a second embodiment this invention will now be further explained by referring to the differences between the first and second embodiments of this invention. FIGS. 6A and 6B show the characteristic shapes of the second embodiment of the polyhedral member of this invention. The upper and lower surfaces 17 of the polyhedral member are formed Just as in the first embodiment. The two sides of each of these surfaces meet at two points 21'.

Each of the side surfaces 11, 12 has a convex surface 13 and a concave surface 14. Both of them are formed along a direction perpendicular to the upper and lower surfaces. The convex surface 13 extends from the center of the distance between the two tips to one of the tips 2, and the concave surface extends symmetrically from the same center to the opposite tip.

As shown in FIG. 6B, tips 2 are defined by the part where the convex and concave surfaces abut each other.

In this embodiment, the convex and concave surfaces project and recede toward the central part of the thickness T, respectively. The ridge formed between the part of the convex surface that projects the most and the part of the concave surface that recedes the most is represented by a vertical line 21. It forms one end of the convex and concave surfaces. The convex surface progressively protrudes from the edge of the top or bottom surface toward one tip. The concave surface progressively recedes from the edge of the top or bottom surface toward the other tip. As shown in FIG. 6A, the tip portions, viewed from above, show envelopes profiled by the points corresponding to the line 21 of the polyhedral member. The envelopes form unique loci of the members of this invention when the members are rotated about the shaft 6 or axis B.

Figure 5B:
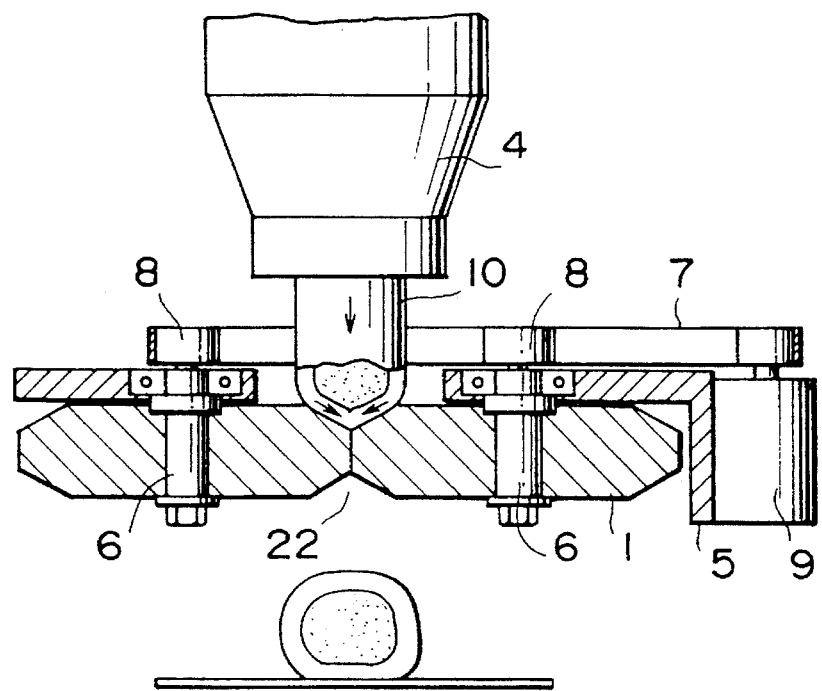
Figure 9:
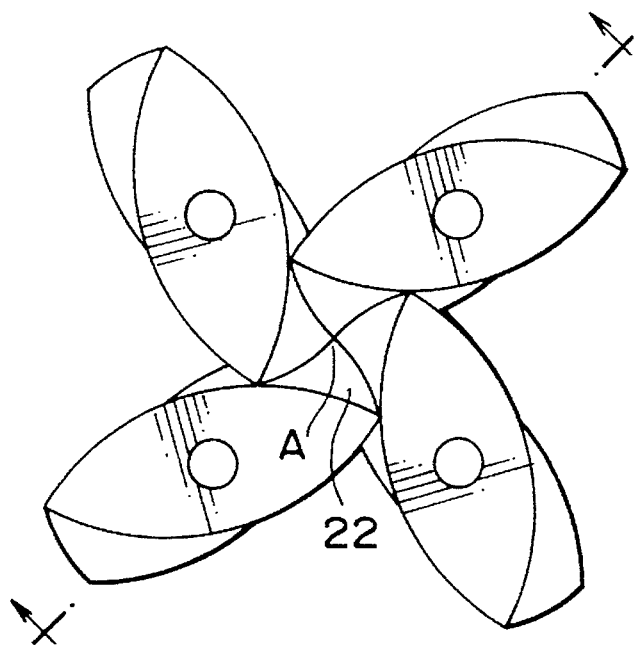

The hatched cross section of the polyhedral member 1 of FIG. 5B shows a cross section cut along the line indicated by the arrows shown in FIG. 9.

Figure 7:
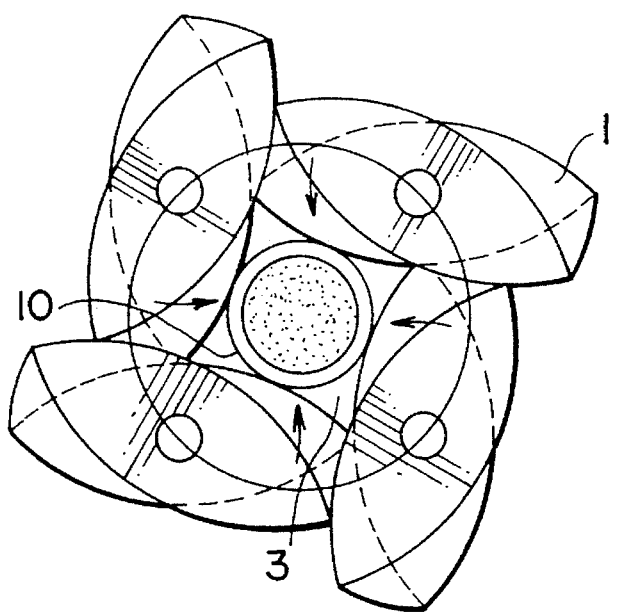
FIGS. 7–10 and FIGS. 11–14 are schematic views showing the functions of the cutting and shaping process of an assembly using the second embodiment.
Figure 8:
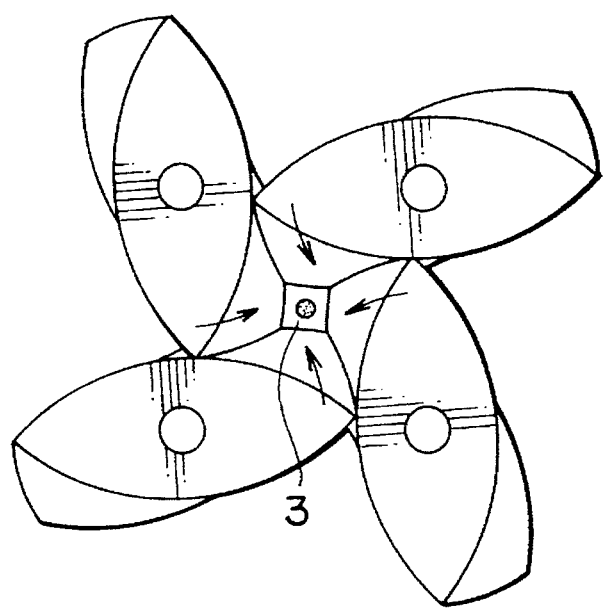

As shown in FIGS. 7 and 8, the opening 3 is closed as follows: 1) as the polyhedral members 1 rotate in a direction indicated by the arrows, the opening 3 becomes gradually smaller, 2) soon the leading ends of the convex surfaces 21 (FIG. 6B) of the tips 2" collect at the center A so that the opening disappears (FIG. 9), 3) and at this time recesses 22 (FIGS. 5B and 9), surrounded by the slopes 15,16 of the convex surfaces 13, appear around the center A on each of the upper and lower surfaces of the members.

Figure 10:
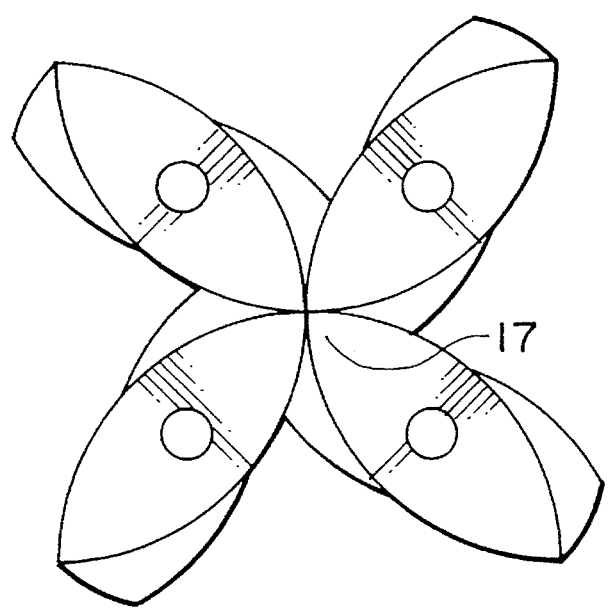
Figure 11:
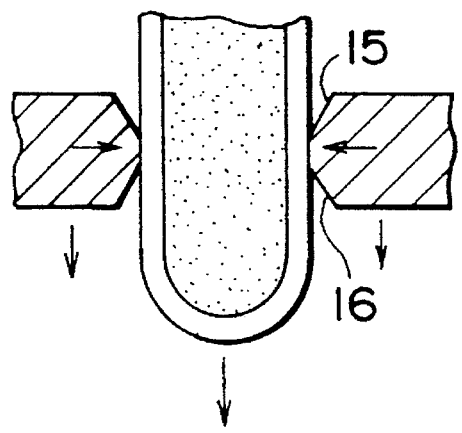
Figure 12:
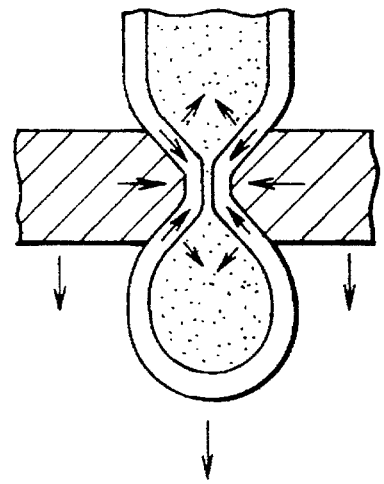
Figure 13:
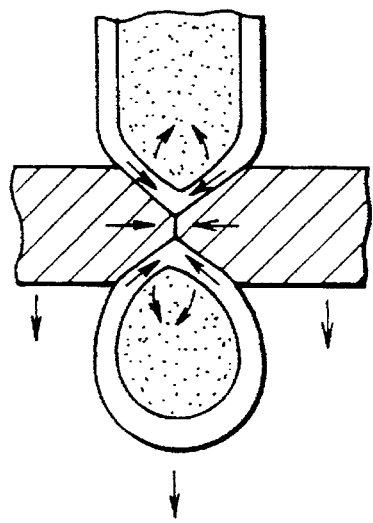
Figure 14:
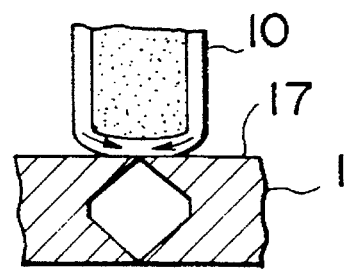

As shown in FIGS. 10 and 14, when the members continue rotating, the recesses 22 disappear and the upper and lower surfaces of all polyhedral members meet at points 21' (FIG. 6B).

This continuous closing process, containing a phase wherein the recesses 22 appear and a phase wherein the upper and lower surfaces 17 replace the recesses, is a feature of this invention. It forcedly induces the coating material to move to the top and bottom parts of the product to be cut so that even very elastic dough can be effectively processed.

As shown in FIG. 6B, the degree of the projection of the convex surfaces and the degree of the recess of the concave surfaces increase toward the tip 2 so that slopes 16,17 increasingly incline toward a horizontal plane.

This means that when the convex surfaces 13 penetrate the bar-shaped dough body, the slopes 15,16 effectively induce the dough coating to move to the central part.

In other words, as shown in FIGS. 11–14, as the slopes 15,16 incline toward the horizontal with the penetration of the convex surfaces 13, the dough in an area where it contacts the slopes moves toward the central part, and by so doing the top and bottom parts of the product to be cut can be smoothed while the dough coating moves toward the central part.

Finally, the closing state shown in FIG. 14 completes the cutting and shaping operation of this invention.

The amount of the dough coating that is moved at this time by the side surface 11 or 12 toward the center can be adjusted by changing the degree of projection or recess of the convex and concave surfaces 13,14, and also by changing the thickness T of all or the tip portion of each polyhedral member.

In this cutting and shaping process, generally the thickness T of each polyhedral member 1 depends on the properties of the dough to be processed. The thickness of the member is preferably the same as or less than the diameter of a dough bar to be cut.

In these circumstances dough can be cut and shaped without making the cover too thin or having it broken.

Since the tip 2 of the polyhedral member 1 tracks the side surface 11 or 12 of an adjacent member, and scrapes material sticking thereto, even a very sticky, soft material can be cut and shaped without any adhesion.

In one of embodiments of this invention four polyhedral members are used to cut dough twice per revolution thereof. However, the number and the shapes of the polyhedral members are not limited by this embodiment.

Figure 15A:
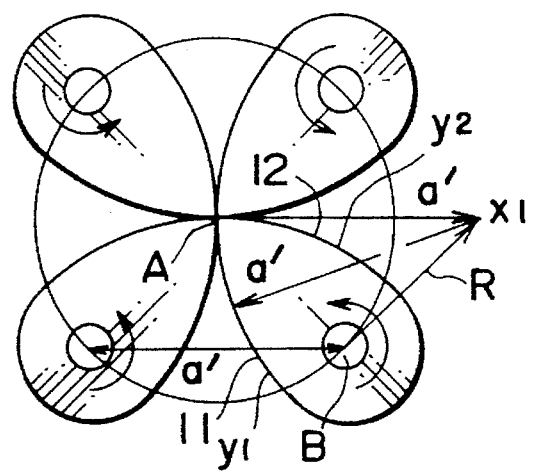
FIGS. 15A, 15B, 16A, and 16B show other embodiments of this invention.
Figure 15B:
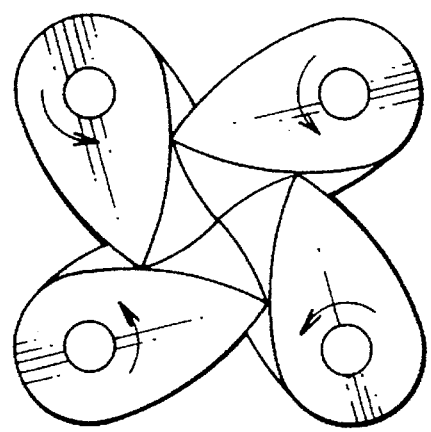

FIGS. 15A and 15B show another embodiment of the assembled polyhedral members of this invention, wherein four polyhedral members in different shapes are used. Since one of the tip portions of each polyhedral member is omitted, the assembly cuts dough once per revolution.

Figure 16A:
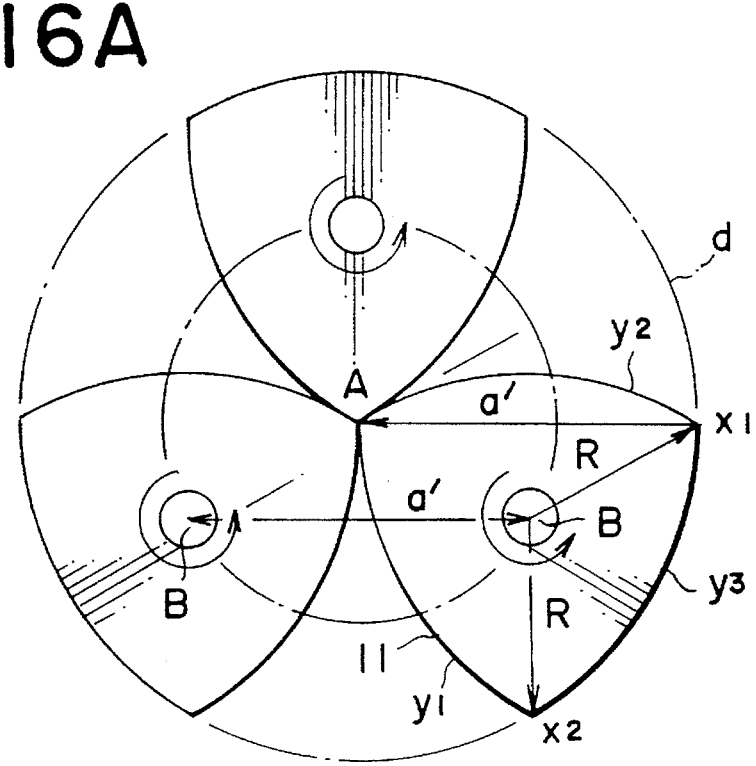
Figure 16B:
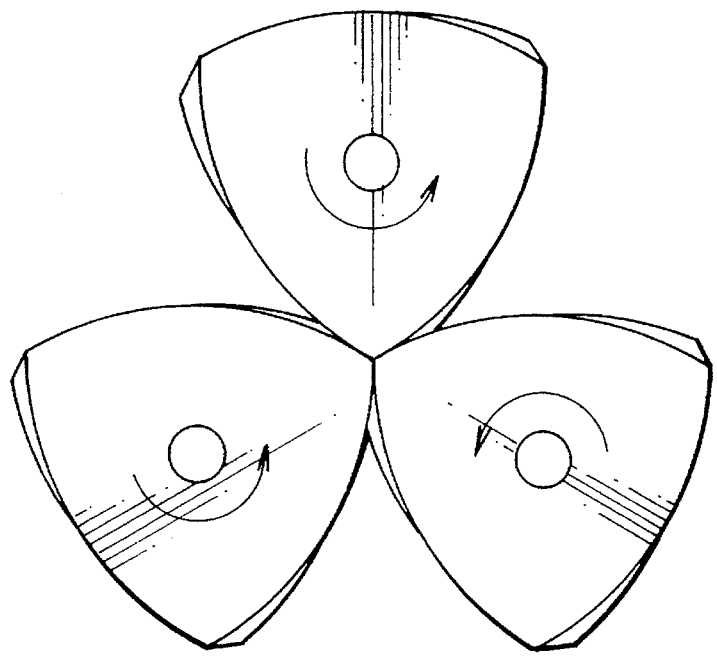

FIGS. 16A and 16B show further embodiments of the assembled polyhedral members, wherein three members in further different shapes are used. In this case the assembly cuts dough three times per revolution. In these embodiments each of the members has three side surfaces forming a tip between every two adjacent sides, and each envelope of the side surfaces is formed along an arc whose radius is equal to the distance between two adjacent shafts.

Five or more polyhedral members may also be equidistantly disposed on a circle to cut and shape a bar-shaped dough body according to the properties of the dough or the required operating conditions.

Thus, the number of dough products cut and shaped per revolution and the size of a product to be cut and shaped can be changed by providing assemblies consisting of different numbers of polyhedral members with different numbers of sides.

EFFECTS OF THE INVENTION

As is explained above, the apparatus of this invention can cut and shape a completely enveloped product with a cover of a constant thickness and without the filling protruding. These effects are due to the structure of this invention, in which the tips of polyhedral members track the side surfaces of adjacent members while continuously revolving in one direction, and in which the convex surfaces formed on the side surfaces, whose degree of projection increases toward the tip, penetrate the bar-shaped dough to cut and shape a spherical body in a continuous operation containing two phases of cutting so that the coating material of even a very elastic material is adequately induced to move to the central part.

Due to this unique mechanism no residual dough parts or adhesion-preventing powders are left around the central portion of the collected polyhedral members. Thus any problem caused by them, such as sticking or clogging, is avoidable. Also, even a very sticky material can be cut and shaped without any impediment due to adhesion.

The quantity of the products produced or the like can be changed freely by changing the number of polyhedral members and of their side surfaces.

In addition, the revolving structure of this invention, differing from that of conventional devices, enables the members to be continuously operated for a long time without generating any seize-up of the cutting and shaping members.

I claim:

1. A polyhedral member used in an assembly for cutting and shaping a bar-shaped dough body, wherein the assembly comprises at least three of the polyhedral members pivotally supported through shafts that are equidistantly disposed on an imaginary circle, each polyhedral member comprising:

upper and lower parallel plane surfaces, the upper and lower planes being separated by a predetermined thickness, two longitudinal side surfaces, each of which being formed along an arc having a radius which is equal to a distance between two adjacent shafts, and two tips at which the two longitudinal side surfaces abut each other, the tips forming cutting edges, wherein when the tips of the polyhedral members are positioned at a center of the circle, each of the centers of the arcs corresponding to the two side surfaces of the polyhedral members is located at a distance from the shaft of a member that is equal to the radius of the circle, and at a distance from the center of the circle that is equal to the distance between two adjacent shafts, and wherein the members form between themselves an opening that can be closed by the rotational movement of the members.

2. The polyhedral member of claim 1, wherein each of the side surfaces is configured such that a first side surface on the side of one tip is convex about an axis orthogonal to the shaft, and the surface on the side of the other tip is concave.

3. The polyhedral member of claim 2, wherein degree of projection of the convex surface or of the recess of the concave surface is increasingly sharper toward the tip.

4. An apparatus for cutting and shaping a bar-shaped dough body comprising at least three polyhedral members, each polyhedral member comprising:

upper and lower parallel plane surfaces, the upper and lower planes being separated by a predetermined thickness, two longitudinal side surfaces, each of which being formed along an arc having a radius which is equal to a distance between two adjacent shafts, and two tips at which the two longitudinal side surfaces abut each other, the tips forming cutting edges, wherein when the tips of the polyhedral members are positioned at a center of the circle, each of the centers of the arcs corresponding to the two side surfaces of the polyhedral members is located at a distance from the shaft of a member that is equal to the radius of the circle, and at a distance from the center of the circle that is equal to the distance between two adjacent shafts, and wherein the polyhedral members are associated such that the members radially and collectively close an opening concentric to the circle, a tip portion of one polyhedral member tracks the side surface of an adjacent polyhedral member, and wherein the opening is confined through the side surfaces of the polyhedral members by the rotary movement thereof so that the bar-shaped dough body passing through the opening is cut and shaped.

5. The polyhedral member of claim 1, wherein one tip portion of the polyhedral member is cut away.

6. An apparatus for cutting a bar-shaped dough comprising three identically-shaped polyhedral members, each member being rotatably fitted to one of three shafts that are equidistantly disposed on an imaginary circle such that the members radially and collectively close an opening concentric to the circle, wherein each of the members has three sides forming a tip between every two adjacent sides, each side being formed along an arc having a radius equal to a distance between two adjacent shafts, wherein when one of the tips is positioned at the center of the circle each center of the arcs that correspond to the two sides that abut each other at the circle's center is at the same time located at a distance from the shaft of a member that is equal to the radius of the circle and at a distance from the center of the circle that is equal to the distance between two adjacent shafts, the center of the arc corresponding to the remaining side is located at the center of the circle, and wherein the members are associated such that the opening is closed by the rotation of the members so that the bar-shaped dough body passing through the opening is cut and shaped.

7. The apparatus of claim 6, wherein each of the sides of each member has convex and concave surfaces complementary to each other, the convex surface projecting horizontally outwardly from the side and extending from a middle between two tips of the member to one of the tips, the concave surface receding horizontally inwardly from the side and extending from the middle between the two tips of the member to the other of the tips.

8. The polyhedral member of claim 4, wherein each of the side surfaces is configured such that a first side surface on the side of one tip is convex about an axis orthogonal to the shaft, and the surface on the side of the other tip is concave.

9. The polyhedral member of claim 8, wherein a degree of projection of the convex surface or of the recess of the concave surface is increasingly sharper toward the tip.

10. The polyhedral member of claim 2, wherein one tip portion of the polyhedral member is cut away.

11. The polyhedral member of claim 3, wherein one tip portion of the polyhedral member is cut away.

12. The apparatus of claim 4, wherein one tip portion of each polyhedral member is cut away.

13. A polyhedral member used in an assembly for cutting and shaping a bar-shaped dough body, the polyhedral member comprising:

a central axis;

a first surface disposed perpendicular to the central axis, the first surface having first and second curved sides meeting at first and second tips, each of the first and second tips being formed at a common distance from the central axis and being positioned such that the central axis, the first tip and the second tip are aligned along a first line;

wherein a shape of the first curved side is defined by a first arc having a first central point located at the common distance from the central axis, and a shape of the second curved side is defined by a second arc having a second central point located at the common distance from the central axis; and wherein the central axis, the first central point and the second central point are aligned along a second line, the second line being perpendicular to the first line.

14. A polyhedral member of claim 13, further comprising:

a second surface disposed parallel to the first surface and separated from the first surface by a predetermined thickness, the second surface having third and fourth curved sides meeting at third and fourth tips, the third and fourth curved sides having shapes similar to the first and second curved sides, respectively;

wherein a first edge formed between the first and third tips and a second edge formed between the second and fourth tips are parallel to the central axis.

15. A polyhedral member of claim 14, wherein the predetermined thickness separating the first and second surfaces is tapered adjacent the first and third tips, and is tapered adjacent the second and fourth tips.

16. A polyhedral member of claim 15, wherein the member includes a shaft defining the central axis.

17. A polyhedral member of claim 13, further comprising:

a second surface disposed parallel to the first surface and separated from the first surface by a predetermined thickness, the second surface having third and fourth curved sides meeting at third and fourth tips, the third and fourth curved sides having shapes similar to the first and second curved sides, respectively;

wherein the first and second surfaces are arranged such that the first and third tips are displaced by a predetermined angle with respect to the central axis, and the second and fourth tips are displaced by the predetermined angle with respect to the central axis.

* * * * *